United States Patent
Darmes et al.

(10) Patent No.: US 7,735,446 B2
(45) Date of Patent: Jun. 15, 2010

(54) COATING INSTALLATION AND METHOD FOR OPHTHALMIC LENS

(75) Inventors: Daniel Darmes, Charenton le Pont (FR); Yohann Felten, Charenton le Pont (FR); Noemie Lesartre, Charenton le Pont (FR); Gilles Menges, Charenton le Pont (FR); Dominique Rychel, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 540 days.

(21) Appl. No.: 11/641,014

(22) Filed: Dec. 19, 2006

(65) Prior Publication Data

US 2007/0196569 A1    Aug. 23, 2007

(30) Foreign Application Priority Data

Dec. 23, 2005    (FR)    .................................. 05 13268

(51) Int. Cl.
  *B05C 13/02*    (2006.01)
  *B05C 11/00*    (2006.01)
  *B05C 11/02*    (2006.01)
  *B05B 5/00*    (2006.01)

(52) U.S. Cl. ........................... 118/62; 118/642; 118/58; 118/319; 118/52; 118/50; 118/66; 118/500

(58) Field of Classification Search ......... 118/641–643, 118/50, 58, 62–64, 52, 612, 319, 320, 66, 118/500, 503; 427/162, 331, 487, 508, 240; 250/492.1, 504 R
See application file for complete search history.

(56) References Cited

U.S. PATENT DOCUMENTS

| 4,443,061 A * | 4/1984 | Coquin ....................... 359/892 |
| 5,097,136 A | 3/1992 | Meyer et al. |
| 6,296,707 B1 * | 10/2001 | Adamczyk et al. .......... 118/668 |
| 2006/0269663 A1 * | 11/2006 | Mori ........................... 427/240 |

FOREIGN PATENT DOCUMENTS

| EP | 0 267 679 A | 5/1988 |
| EP | 0 547 312 A | 6/1993 |
| JP | 2004 255330 A | 9/2004 |
| JP | 2004 290857 | 10/2004 |
| WO | 00/14295 A | 3/2000 |

* cited by examiner

*Primary Examiner*—Yewebdar T Tadesse
(74) *Attorney, Agent, or Firm*—Young & Thompson

(57) ABSTRACT

The installation includes elements for the temporary injection of inert gas; and at least one individual and autonomous casing (6) provided with a window (13) and including receiving elements for a support (3) carrying an ophthalmic lens (2), and sealing elements (21) adapted to form around the ophthalmic lens (2) a sealed enclosure, that enclosure including a non-return inlet member adapted to cooperate with the elements for the temporary injection of inert gas.

19 Claims, 5 Drawing Sheets

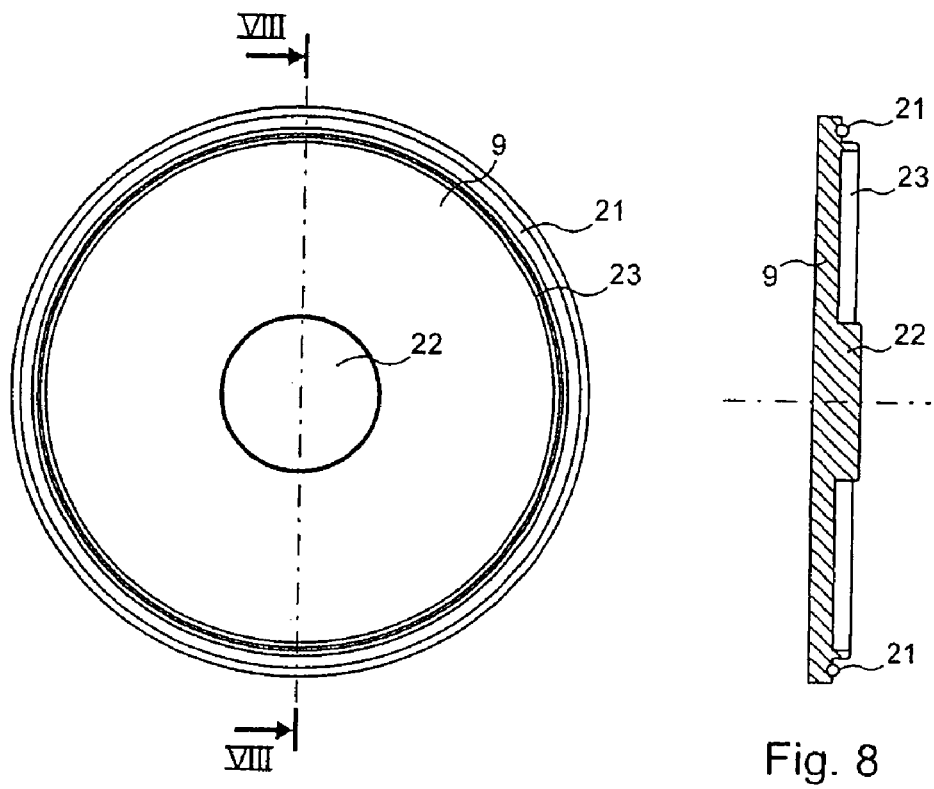
Fig. 7
Fig. 8
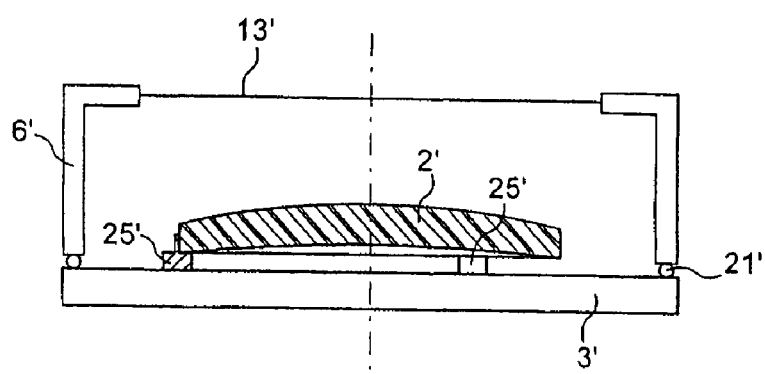
Fig. 9

COATING INSTALLATION AND METHOD FOR OPHTHALMIC LENS

The invention concerns the field of the fabrication of ophthalmic lenses.

The invention concerns more particularly an installation and a method for depositing a coating on an ophthalmic lens and then polymerizing that coating.

For the fabrication of a pair of eyeglasses, an ophthalmic lens is first produced, generally by molding or by machining, after which that ophthalmic lens undergoes a trimming operation consisting in machining it from its edge so that its contour corresponds to the rims of the eyeglass frame in which the ophthalmic lens is to be mounted.

Before or after the trimming operation, one or several coatings may be applied to the faces of the ophthalmic lens in order to confer upon the latter properties such as, for example, antireflection, anti-impact, antiscratching, or filtering of ultraviolet rays.

Certain techniques for application of these coatings consist in the application to a face of the ophthalmic lens of the coating in the liquid state, then in polymerizing that coating by exposing the ophthalmic lens to a source of radiation adapted to harden the coating. If the coating is sensitive in particular to the gases present in the atmosphere, it may be necessary to place the ophthalmic lens provided with its coating in the liquid state in an inert atmosphere before and/or during its polymerization.

There is known from the document JP 2004 255330 a device and a method including a reserve chamber, a polymerization chamber communicating in a sealed manner with the reserve chamber, and a conveyor unit disposed inside the reserve chamber for moving an ophthalmic lens between the reserve chamber and the polymerization chamber whilst maintaining a controlled atmosphere in these two chambers, which together form a sealed enclosure.

Moreover, the document JP 2004 290857 describes a coating device including a turntable provided with a plurality of lens supports, a coating deposition station, and a polymerization station. These two stations are mobile vertically relative to the turntable so that a lens mounted on one of the lens supports may be offered up to the deposition station to receive the coating in the liquid state there, and then, following rotation of the turntable, the lens is offered up to the polymerization station, which includes an irradiation source, a preliminary chamber and an irradiation chamber, each of which chambers can be hermetically sealed and the atmosphere of which chambers can be controlled.

The object of the invention is to improve the deposition of this type of coating on ophthalmic lenses.

To this end, the invention is aimed at an installation adapted to the coating of ophthalmic lenses, including a coating deposition station, a polymerization station, means for moving the ophthalmic lenses from the coating deposition station to the polymerization station, and means for creating an inert gas atmosphere around the ophthalmic lenses, characterized in that the means for creating an inert gas atmosphere include means for the temporary injection of inert gas; and at least one individual and autonomous casing provided with a window and including receiving means for a support carrying an ophthalmic lens, and sealing means adapted to form around the ophthalmic lens a sealed enclosure, that enclosure including a non-return inlet member adapted to cooperate with the means for the temporary injection of inert gas.

Such an installation enables the ophthalmic lens, immediately after the deposition of the fluid coating, to be confined in a controlled atmosphere that will follow the lens in its movements, the latter leaving the controlled atmosphere only once polymerization is terminated. This enclosure formed around the lens being autonomous and having no reference other than the lens itself, the controlled atmosphere becomes independent of any malfunctioning of the coating deposition, polymerization or conveyor machines.

The invention also enables control of the volume and the composition of the inert gas inside the autonomous enclosure, which enables reproducibility of the fabrication conditions from one lens to another.

Such an autonomous enclosure furthermore enables an ophthalmic lens to be extracted from the production line, for example to await further attention, whilst keeping the ophthalmic lens in a controlled atmosphere. For example, the fabrication of ophthalmic lenses may be rendered more flexible by depositing the coating onto a certain number of ophthalmic lenses each disposed thereafter in their respective autonomous enclosure, storing these enclosures and then polymerizing them all at once in a polymerization device that has no controlled atmosphere because each of the lenses is associated with its own controlled atmosphere.

The possibility of moving each lens with its associated controlled atmosphere therefore makes the fabrication of the lenses more flexible and independent of the controlled atmosphere installations associated with the various fabrication stations.

According to a preferred feature, the enclosure further includes a non-return exhaust member enabling the gas present in the enclosure to exit as and when the inert gas is injected.

This non-return exhaust member, and likewise the non-return inlet member, may include a duckbill type seal.

According to a preferred feature, the means for the temporary injection of inert gas include a connector connected to a source of inert gas.

In one embodiment, the enclosure is formed by the association of the casing and a base.

The receiver means may then include a boss disposed on the base.

The sealing means may also include an O-ring disposed between the casing and the base.

A hinge may additionally be provided for articulating the casing and the base, together with magnets, or toggle clip type clamps, for holding the casing against the base.

Alternatively, the enclosure is formed by the direct cooperation of the casing and the support.

The sealing means may then include a seal disposed between the casing and the support.

The casing may further include a deflector disposed facing the non-return inlet member for breaking up the jet of inert gas.

According to other preferred features:
the window is adapted to filter UVB rays; and
the support carrying the ophthalmic lens also holds the ophthalmic lens at the coating deposition station, which enables the lens to be mounted on the same support throughout the coating process.

According to another object, the invention is aimed at a method of coating an ophthalmic lens, including the following steps:
disposing an ophthalmic lens on a support;
depositing on the ophthalmic lens a coating that has to be polymerized in a controlled atmosphere;
placing the ophthalmic lens in an inert gas atmosphere;
polymerizing said coating;

characterized in that the step of disposing the ophthalmic lens in an inert gas atmosphere is effected by means of the following steps:

associating the support with an individual and autonomous casing provided with a window and including: means for receiving a support carrying an ophthalmic lens, and sealing means for forming around the ophthalmic lens a sealed enclosure, that enclosure including a non-return inlet member adapted to cooperate with means for the temporary injection of inert gas;

connecting the enclosure to means for the temporary injection of inert gas via the non-return inlet member;

injecting inert gas into the enclosure;

disconnecting the enclosure from the means for the temporary injection of inert gas.

The method procures the same advantages as the installation.

Other features and advantages of the invention will become apparent in the light of the following description of one preferred embodiment given by way of nonlimiting example, which description is given with reference to the appended drawings, in which:

FIG. 7 is a view from above of the base of the enclosure from FIGS. 2 to 4;

FIG. 8 is a view in section taken along the line VIII-VIII in FIG. 5;

FIG. 9 is a diagrammatic view in section of an individual and autonomous enclosure according to one variant of the invention;

Figure 1:
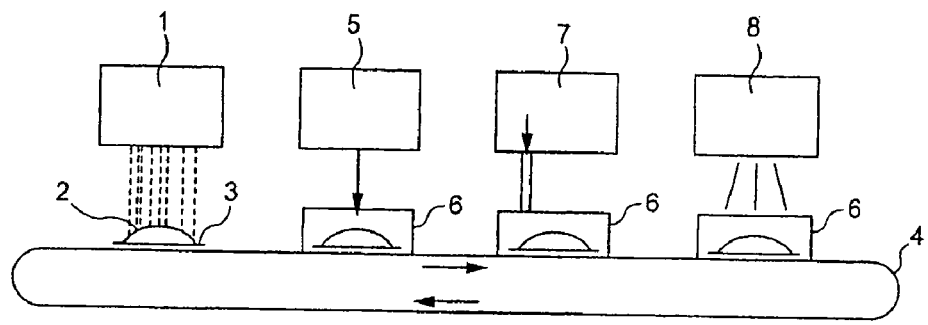
FIG. 1 is a diagrammatic view of an installation according to the invention.

The installation represented diagrammatically in FIG. 1 is for applying a coating to ophthalmic lenses. This installation includes a deposition station 1 for depositing a coating in the liquid state on an ophthalmic lens 2 mounted on a support 3. This deposition station 1 is advantageously of the "spin" type, i.e. adapted to deposit on the ophthalmic lens a coating in the liquid state and to drive the support 3 in rotation so that centrifugal force spreads the coating over the surface of the ophthalmic lens 2.

The assembly formed by the ophthalmic lens 2 and its support 3 is then moved, for example by means of a conveyor belt 4, to an association station 5 adapted to associate the support 3 fitted with the lens 2 with an individual and autonomous casing 6. The assembly is then moved to an injection station 7 adapted to inject an inert gas into the casing 6.

The assembly is finally moved to a photopolymerization station 8 adapted to irradiate the ophthalmic lens contained in the casing 6 to effect the polymerization of the coating. During polymerization, the coating hardens and becomes stable and the ophthalmic lens may then be separated from the casing 6 to continue the conventional process of fabrication of an ophthalmic lens adapted to a particular eyeglass frame.

Figure 2:
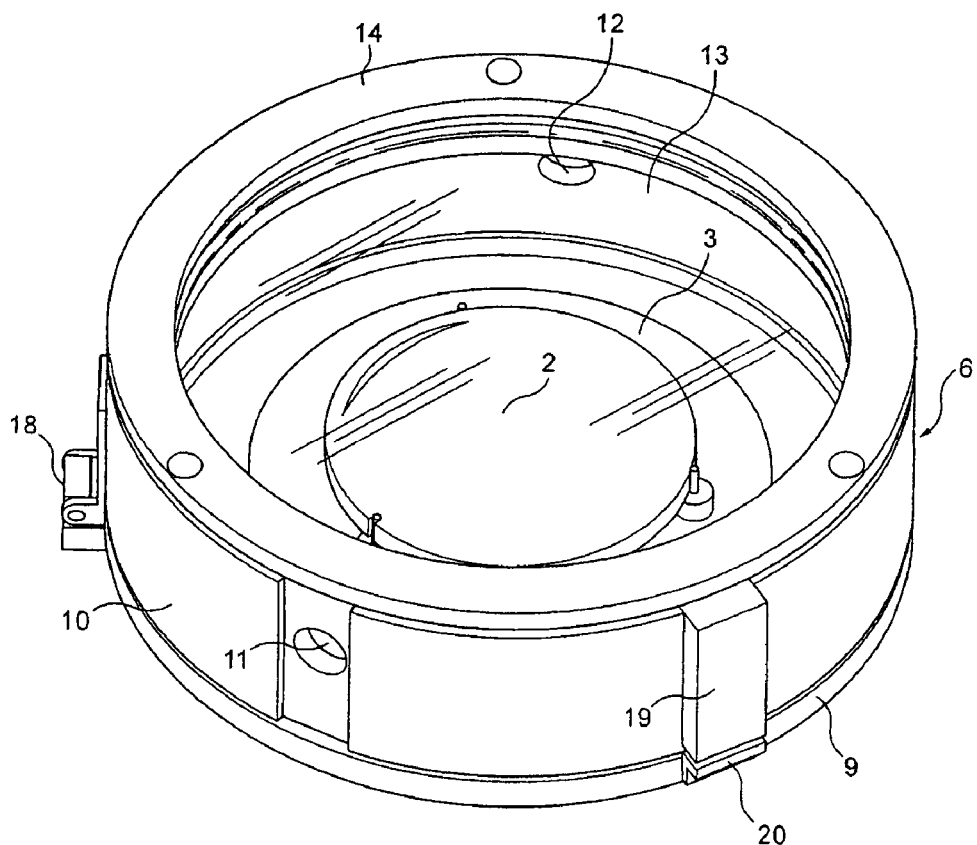
FIG. 2 represents in perspective one of the individual and autonomous enclosures employed by the installation from FIG. 1, the enclosure being closed.

FIG. 2 represents in perspective the assembly formed by the support 3 fitted with the lens 2 and the casing 6.

The casing 6 forms with a base 9 a sealed, autonomous and individual enclosure.

Figure 3:
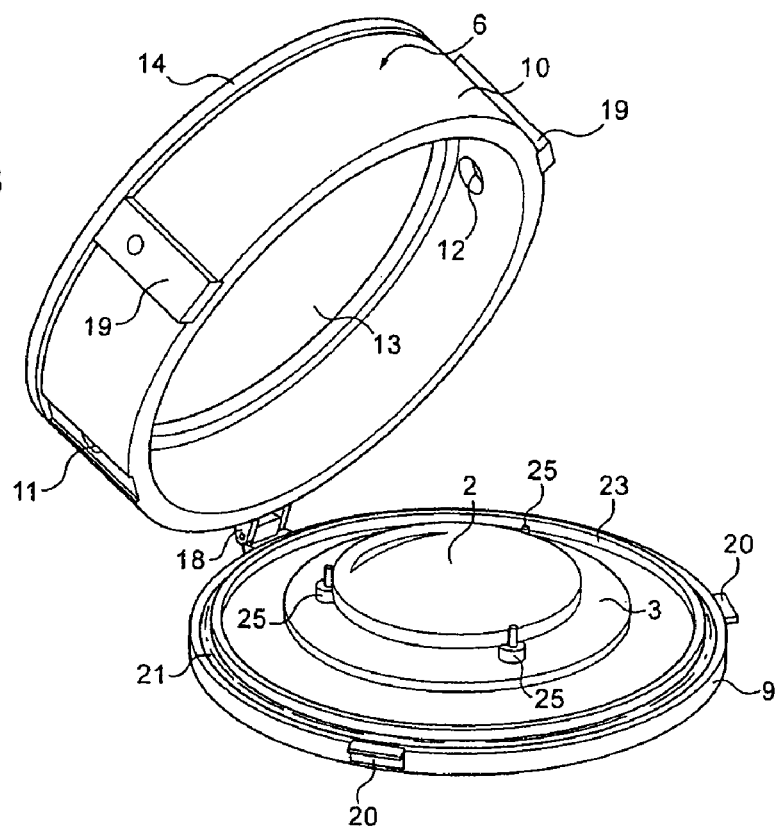
FIGS. 3 and 4 show in perspective the enclosure from FIG. 2 in the open position.
Figure 4:
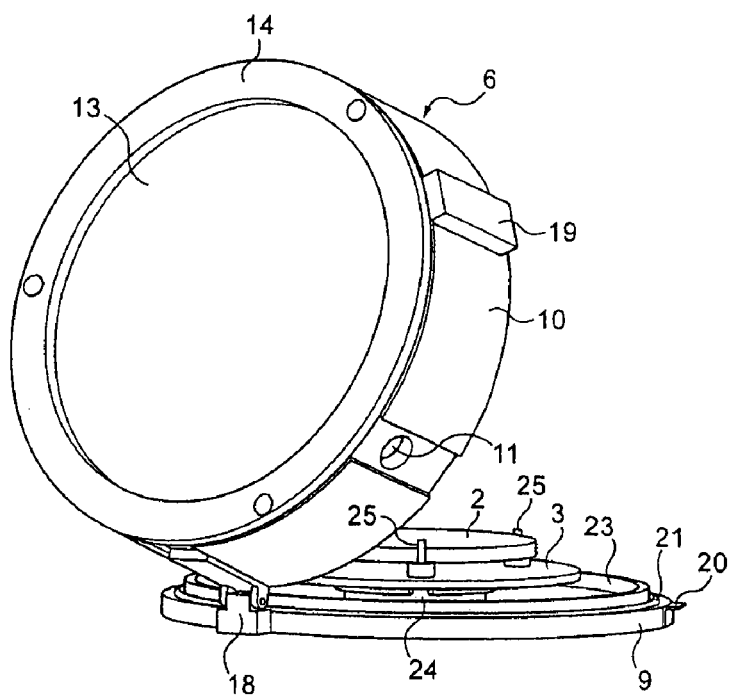

That enclosure is represented open in FIGS. 3 and 4.

The casing 6 is formed of a cylindrical body 10 including an injection orifice 11 and an exhaust orifice 12.

One of the ends of the body 10 is closed by a window 13 mounted against the body 10 by means of a flange 14. The window 13 consists, for example, of a disk of glass, of plexiglass, or of any other polymer, possibly chosen to filter certain light rays. In the present example, the window 13 allows UVA rays to pass and filters UVB rays.

The flange 14 holds the window 13 against the body 10 in a sealed manner, thanks to a seal (not visible in the figures).

Figure 5:
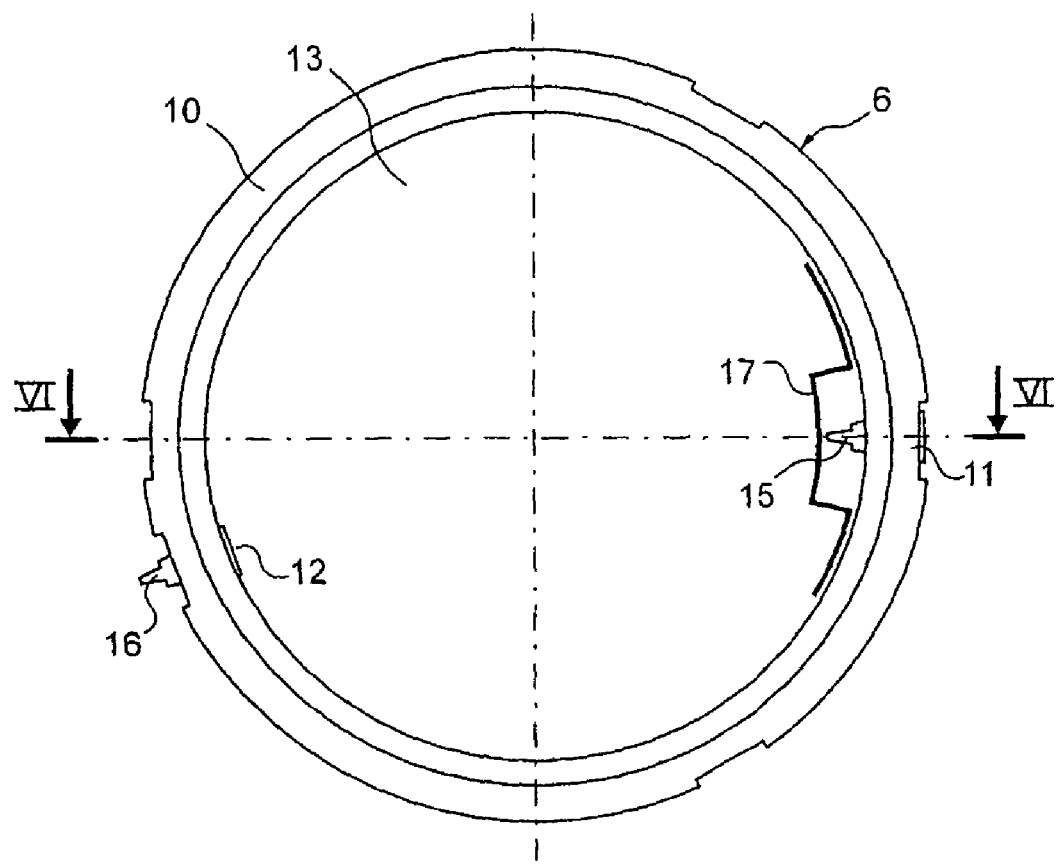
FIG. 5 is a view from above of the enclosure body from FIGS. 2 to 4.
Figure 6:
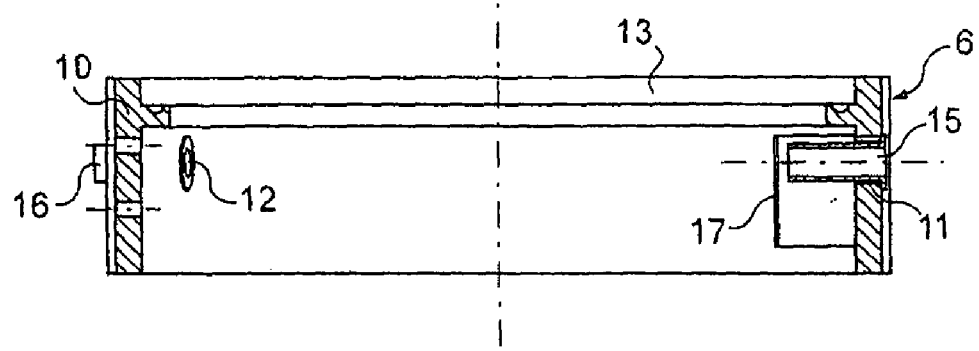
FIG. 6 is a view in section taken along the line VI-VI in FIG. 5.

In FIGS. 5 and 6, the body 10 of the casing 6 is represented with a unidirectional "duckbill" type flexible seal 15, 16 mounted in each of the injection orifice 11 and exhaust orifice 12. This type of flexible seal has a check valve function enabling gas to flow through the orifice in one direction but preventing the flow of gas in the contrary direction.

Referring to FIG. 5, the injection orifice 11 is therefore provided with a duckbill seal 15 facing toward the interior of the body 10 (i.e. allowing gas only to enter the body 10) and the exhaust orifice 12 is provided with an exhaust duckbill seal 16 facing toward the outside of the body 10 (i.e. allowing only exit of the gas contained in the body 10).

The body 10 further includes a deflector 17 fixed to its internal wall opposite the injection duckbill seal 15 (see FIGS. 5 and 6). This deflector 17 contributes to the diffusion of the gas entering via the injection orifice 11 into the interior of the body 10, by breaking up the jet of gas so as not to create turbulence directly on the lens.

Referring to FIGS. 3 and 4, the casing 6 is mounted on the base 9 by way of a hinge 18 so that the sealed enclosure formed by the casing 6 and the base 9 can be opened and closed.

Two magnets 19 mounted on the body 10 are adapted to cooperate with metal lugs 20 mounted on the edge of the base 9 to lock the enclosure closed.

The magnets 19 may be replaced by any other type of holding means, for example toggle clip type clamps.

An O-ring 21 is moreover disposed at the periphery of the base 9 to ensure a sealed contact between the casing 6 and the base 9.

Referring to FIGS. 7 and 8, the base 9 is formed of a disk of the same diameter as the cylindrical body 10 and including a projecting central boss 22 and a circular rim 23 for correctly positioning the cylindrical body 10 against the O-ring 21.

The central boss 22 locates the support 3 of the ophthalmic lens 2 on the base 9. This support 3 is a conventional support for holding an ophthalmic lens during the application of a fluid coating, with or without driving the lens in rotation, and including a circular skirt 24 (see FIG. 4) of slightly greater diameter than the central boss 22. The support 3 can thus be nested over the central boss 22 so that, in the present example, the center of the disk constituting the support 3 coincides with the center of the base 9. In the present example, the support 3 is provided with three studs 25 for holding the ophthalmic lens 2 by its edge.

The casing 6 and the base 9 from FIGS. 2 to 8 are thus adapted to form a sealed, autonomous and individual enclosure for an ophthalmic lens 2.

Alternatively, the sealed enclosure may be constituted by the direct cooperation of a casing with the support of the ophthalmic lens. FIG. 9 shows such a variant. A casing 6' including a window 13' is adapted to be held against an O-ring 21' in turn held against the support 3' carrying an ophthalmic lens 2' by means of three studs 25'. The casing 6' is fastened to the support 3' by magnets or by any other known device (not shown in FIG. 9), for example toggle clip type clamps.

Figure 10:
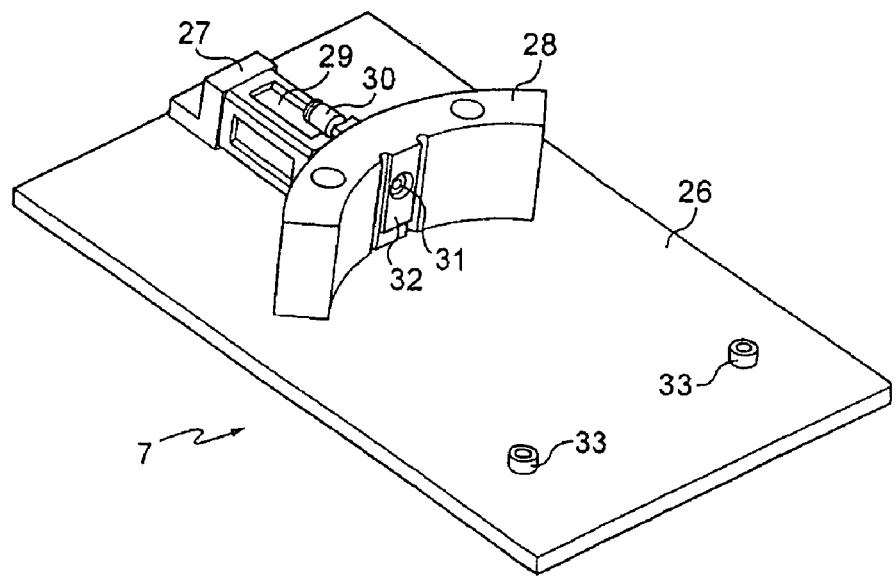
FIG. 10 represents in perspective an inert gas injection station adapted to cooperate with the enclosure from FIGS. 2 to 4.
Figure 11:
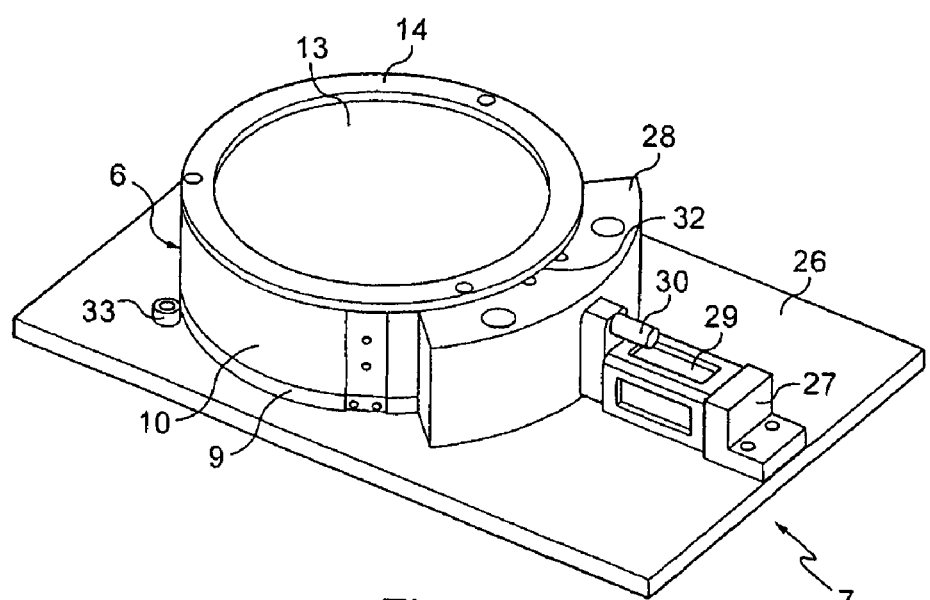
FIG. 11 represents in perspective the injection station from FIG. 9 cooperating with the individual and autonomous enclosure from FIGS. 2 to 4.

FIGS. 10 and 11 represent diagrammatically the injection station 7 from FIG. 1.

In FIG. 10, the injection station 7 includes a plate 26 on which is mounted a stop 27 on which an injection member 28 bears through the intermediary of a spacer 29.

The injection member 28 has a circular arc shape corresponding to the external shape of the body 10 of the casing 6 and includes a connector 30 connected to an injection nozzle 31 discharging onto a surface 32 projecting relative to the remainder of the injection member. The injection nozzle 31 is adapted to cooperate with the duckbill seals 15, 16.

The plate 26 also includes two retaining pegs 33 disposed facing the injection member 28.

FIG. 11 represents a sealed enclosure formed of the casing 6 and the base 9 mounted in the injection station 7. The body 10 of the casing 6 is held between the retaining pegs 33 and the injection member 28. The projecting surface 32 enables the injection nozzle 31 to be compressed against the injection duckbill seal 15.

The connector 30 is intended to be connected to a pipe leading to a source of inert gas (not shown), for example of nitrogen. The elements that have just been described function in the manner indicated hereinafter.

Referring to FIG. 1, the installation for coating the ophthalmic lens includes, following the deposition station 1, which is conventional, an association station 5 in which the support 3 fitted with the ophthalmic lens 2 is positioned on the central boss 22 of the base 9.

The casing 6 is then closed and locked by the magnets 19 to form a sealed enclosure. In the FIG. 9 variant, the casing 6' is mounted directly on the support 3' of the ophthalmic lens 2', which to this end is intended to form the sealed enclosure.

In all embodiments of this sealed enclosure, it is then brought to the injection station 7 where it is placed on the plate 26 so that the connector 30 is able to inject an inert gas through the inlet duckbill seal 15 into the interior of the sealed enclosure.

The injection of inert gas then takes place whilst, in parallel, the gas initially contained in the sealed enclosure escapes via the exhaust duckbill seal 16.

When all of the gas present inside the sealed enclosure has been replaced with the inert gas, injection may be stopped and the ophthalmic lens 2 is, from this moment, protected by a sealed, autonomous and individual enclosure, guaranteeing the presence of an inert atmosphere around the ophthalmic lens 2.

The sealed enclosure may then be withdrawn from the fabrication process, for example to be stored or to await further attention, before finally passing to the photopolymerization station 8 in which a light source is adapted to illuminate the ophthalmic lens 2 via the window 13.

Variant embodiments of the elements described may be envisaged without departing from the scope of the invention and in particular the hinge 18 for joining the casing 6 and the base 9 is optional, and likewise a hinge may be adapted to connect the casing 6' and the base 9' in the FIG. 9 variant.

Similarly, the casing 6, the base 9 and the support 3, 3' may be made from any material, for example a metal alloy or an injection-molded polymer.

The invention claimed is:

1. An installation configured for the coating of ophthalmic lenses, with a coating deposition station (1), a polymerization station (8), means (4) for moving the ophthalmic lenses from the coating deposition station (1) to the polymerization station (8), and means for creating an inert gas atmosphere around the ophthalmic lenses, the means for creating an inert gas atmosphere comprising:
    means (7) for the temporary injection of inert gas; and
    at least one individual and autonomous casing (6), including i) a window (13), ii) receiving means (22) for a support (3) carrying an ophthalmic lens (2), iii) sealing means (21) configured to form a sealed enclosure around the ophthalmic lens (2), the sealed enclosure including a non-return inlet member (15) configured to cooperate with the means (7) for the temporary injection of inert gas, and iv) a deflector (17) disposed facing the non-return inlet member (15).

2. The installation according to claim 1, wherein the sealed enclosure further includes a non-return exhaust member (16).

3. The installation according to claim 2, wherein the non-return exhaust member includes a duckbill type seal (16).

4. The installation according to claim 1, wherein the non-return inlet member includes a duckbill type seal (15).

5. The installation according to claim 1, wherein the means (7) for the temporary injection of inert gas include a connector (30) connected to a source of inert gas.

6. The installation according to claim 1, wherein the sealed enclosure is formed by the association of the casing (6) and a base (9).

7. The installation according to claim 6, wherein the receiving means include a boss (22) disposed on the base (9).

8. The installation according to claim 7, wherein the sealing means include an O-ring (21) disposed between the casing (6) and the base (9).

9. The installation according to claim 7, further comprising:
    a hinge (18) configured to articulate the casing (6) and the base (9).

10. The installation according to claim 7, further comprising:
    magnets (19) configured to hold the casing (6') against the base (9').

11. The installation according to claim 6, wherein the sealing means include an O-ring (21) disposed between the casing (6) and the base (9).

12. The installation according to claim 6, further comprising:
    a hinge (18) configured to articulate the casing (6) and the base (9).

13. The installation according to claim 6, further comprising:
    magnets (19) configured to hold the casing (6') against the base (9').

14. The installation according to claim 6, further comprising:
    toggle clip type clamps configured to hold the casing (6') against the base (9').

15. The installation according to claim 1, wherein the sealed enclosure is formed by the direct cooperation of the casing (6) and the support (3).

16. The installation according to claim 15, wherein the sealing means include a seal (21') disposed between the casing (6') and the support (3').

17. The installation according to claim 1, wherein the window (13) is configured to filter UVB rays.

18. The installation according to claim 1, wherein the support (3) carrying the ophthalmic lens (2) also holds the ophthalmic lens (2) at the coating deposition station (1).

19. The installation according to claim 1, wherein the autonomous casing (6) is mobile for entering and exiting the polymerization station (8).

* * * * *